US011403283B2

(12) United States Patent
Raj et al.

(10) Patent No.: US 11,403,283 B2
(45) Date of Patent: Aug. 2, 2022

(54) DISTRIBUTED LEDGER BASED GENERATION OF ELECTRONIC DOCUMENTS

(71) Applicant: SONY CORPORATION, Tokyo (JP)

(72) Inventors: Ranjeet Ranjan Raj, Bangalore (IN); Madhvesh R Sulibhavi, Bangalore (IN)

(73) Assignee: SONY CORPORATION, Tokyo (JP)

( * ) Notice: Subject to any disclaimer, the term of this patent is extended or adjusted under 35 U.S.C. 154(b) by 240 days.

(21) Appl. No.: 16/601,718

(22) Filed: Oct. 15, 2019

(65) Prior Publication Data

US 2021/0109919 A1  Apr. 15, 2021

(51) Int. Cl.
*G06F 16/93* (2019.01)
*G06N 20/00* (2019.01)
*G06F 16/23* (2019.01)
*G06F 16/27* (2019.01)

(52) U.S. Cl.
CPC .......... *G06F 16/2379* (2019.01); *G06F 16/27* (2019.01); *G06F 16/93* (2019.01); *G06N 20/00* (2019.01)

(58) Field of Classification Search
CPC ..... H04L 2209/38; G06F 16/27; G06F 21/64; G06F 16/2365; G06F 40/186; G06F 16/93; G06F 21/31; G06F 16/182; G06F 21/30; G06N 20/00; G06N 3/08
See application file for complete search history.

(56) References Cited

U.S. PATENT DOCUMENTS

| | | | |
|---|---|---|---|
| 2018/0205546 A1* | 7/2018 | Haque | G06F 21/6245 |
| 2018/0253464 A1 | 9/2018 | Kohli et al. | |
| 2018/0285840 A1 | 10/2018 | Hasan | |
| 2018/0330343 A1* | 11/2018 | Gray | G06Q 20/3829 |
| 2019/0018887 A1 | 1/2019 | Madisetti et al. | |
| 2019/0096021 A1* | 3/2019 | Jarvis | G06F 21/34 |
| 2019/0116036 A1* | 4/2019 | Sabharwal | H04L 9/3239 |
| 2019/0172282 A1* | 6/2019 | Patel | G07C 9/27 |
| 2019/0207770 A1* | 7/2019 | Zhou | H04L 9/0637 |
| 2020/0120023 A1* | 4/2020 | Munson | H04L 49/1553 |

* cited by examiner

*Primary Examiner* — Yuk Ting Choi
(74) *Attorney, Agent, or Firm* — Chip Law Group

(57) ABSTRACT

A data management system is provided. The data management system is communicatively coupled to a distributed ledger that stores electronic document information for users and smart contracts that control access to the document information. The data management system receives a user request, including a user identifier (ID), for an electronic document and identifies a domain associated with the user request. The data management system selects smart contract (s) for the domain from the stored smart contracts and extracts user-specific information for the electronic document from the distributed ledger based on the user ID and the selected smart contract(s). The data management system determines a content ID associated with template information for the electronic document and extracts the template information from the distributed ledger based on the determined content ID and the selected smart contract(s). Based on the user-specific information and the template information, the data management system generates the electronic document.

20 Claims, 7 Drawing Sheets

DISTRIBUTED LEDGER BASED GENERATION OF ELECTRONIC DOCUMENTS

CROSS-REFERENCE TO RELATED APPLICATIONS/INCORPORATION BY REFERENCE

None.

FIELD

Various embodiments of the disclosure relate to data management on distributed databases. More specifically, various embodiments of the disclosure relate to a system and a method for generation of electronic documents based on a distributed ledger.

BACKGROUND

Advancements in data management technology have led to development of distributed ledgers like block chain, which offer transaction security and immutability. In a distributed ledger, a copy of the transaction data may be distributed amongst multiple nodes of the system, such that each node may have knowledge of every transaction. The ledger may include multiple blocks, each representative of data related to a transaction. Further, each node may be capable of verifying every new transaction based on the knowledge of the current state of the ledger. Typically, as data records for particular applications increase on a distributed ledger, the efficiency and computational complexity to access and process such records gets affected, especially in case of decentralized applications that require a low memory footprint as well as a fast processing time.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method for generation of electronic documents based on distributed ledger, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed system and method for generation of electronic documents based on a distributed ledger. Exemplary aspects of the disclosure provide a data management system, which may be communicatively coupled to a distributed ledger (e.g., a block chain network). The distributed ledger may store document information for a plurality of users and a group of smart contracts that controls access to the stored document information. The data management system may receive a user request for electronic document from a user. The user request may include a user identifier (ID) of the user. One or more smart contracts may be selected from a group of smart contracts based on a domain (for e.g., an education domain) identified from the received user request. The data management system may extract user-specific information from the stored document information, based on the user ID and the selected smart contract(s). The data management system may then extract the template information from the stored document information, based on a content ID for the template information and the selected smart contract(s). The electronic document may be generated based on the extracted user-specific information and the extracted template information.

The disclosed system and method provide a memory efficient data management based on a data abstraction framework that abstracts domain specific data, which may be common across users, from user-specific data, which may be private to users. Also disclosed herein is a machine learning system for retrieval of domain specific template data for different domains, so as to handle data from various domains, which may be stored on the distributed ledger. Typically, database systems create multiple copies of documents that include a common template for a particular domain. Common content in such a common template may be repeated in multiple documents. The disclosed data management system creates a common template for each domain and stores a single copy of this common template in a node (e.g., a block chain node). Thus, storage of multiple copies of the common template is avoided, which reduces memory footprint. Further, the disclosed data management system abstracts user-specific content from each scanned document, which may be different for every user, unlike the common content. Thus, whenever the document for a user is requested, the common content and the user-specific content may be combined on the fly and securely provided to the user.

Figure 1:
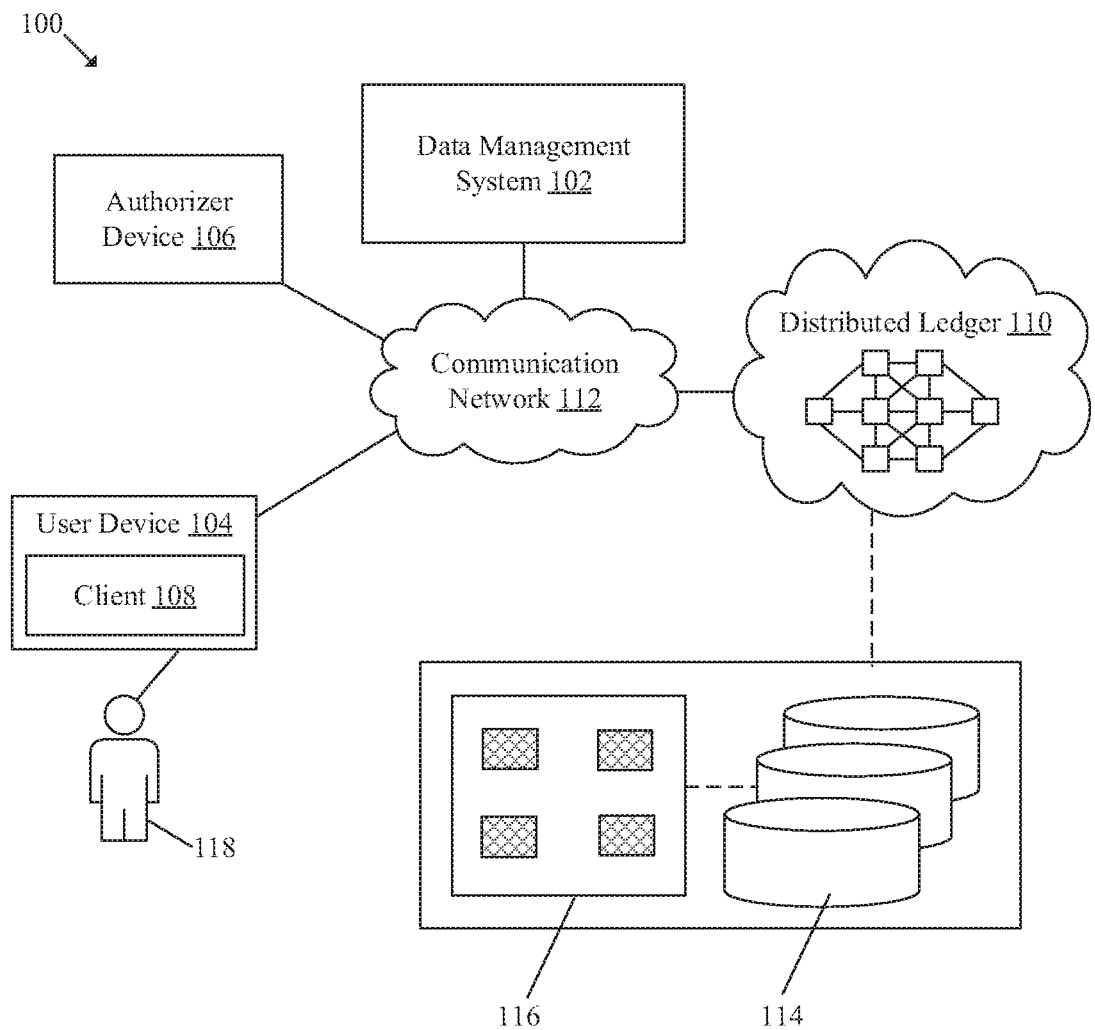
FIG. 1 is a diagram that illustrates an exemplary network environment for generation of electronic documents based on a distributed ledger, in accordance with an embodiment of the disclosure.

FIG. 1 is a diagram that illustrates an exemplary network environment for generation of electronic documents based on a distributed ledger, in accordance with an embodiment of the disclosure. With reference to FIG. 1, there is shown a network environment 100. The network environment 100 includes a data management system 102, a user device 104, and an authorizer device 106. The user device 104 may host a client 108, for example, a web browser. The network environment 100 further includes a distributed ledger 110 and a communication network 112. The communication network 112 may be established among two or more computing devices of the network environment 100. By way of example, the communication network 112 may be among the data management system 102, the user device 104, the authorizer device 106, and the distributed ledger 110. The distributed ledger 110 may store a plurality of blocks 114 and may be associated with a group of smart contracts 116 that may control access to the plurality of blocks 114 of the distributed ledger 110. There is further shown a user 118 associated with the user device 104.

The data management system 102 may include suitable logic, circuitry, and interfaces that may be configured to execute operations associated with generation of an electronic document for a particular domain, for example, education domain. The electronic document may be specific for the user 118 and may be generated based on user-specific information and template information on the distributed ledger 110. Examples of the implementation of the data management system 102 may include, but are not limited to, a server, a distributed network of servers, a computing device, a mainframe machine, a computer work-station, and/or a consumer electronic (CE) device.

In accordance with an embodiment, the data management system 102 may host a decentralized application that may include a client-side interface (a front-end), a server-side interface (a back-end), and a distributed logic. The client-side interface (the front-end) may be configured to load up on the client 108 while the server-side interface may run on the data management system 102. The distributed logic of the decentralized application may be executable on the distributed ledger 110 and may include the group of smart contracts 116. Each smart contract of the group of smart contracts 116 may be a self-executable program or a computer code that may run on the distributed ledger 110 and may include a set of conditions under which multiple parties to the smart contract agree to interact with each other. The smart contract may be stored at a specific address on the distributed ledger 110 and may be a collection of the computer code (i.e. functions) and data (i.e. state of account (s)).

The user device 104 may include suitable logic, circuitry, and interfaces that may be configured to access the client-side interface of the decentralized application hosted on the distributed ledger 110, via the client 108. For example, the client 108 may be a web browser that loads up the client-side interface of the decentralized application. The client 108 may have provisions to generate a user request for the electronic document and then transmit the user request to the data management system 102. Based on the transmitted user request, the client 108 may receive the electronic document generated as a readable file from the data management system 102. The user device 104 may include suitable Input/output (I/O) functionality and networking functionality to facilitate a communication of the client 108 with the data management system 102. Examples of the user device 104 may include, but are not limited to, a computing device, a mobile phone, a smart phone, a computer work-station, and/or any CE device.

The authorizer device 106 may include suitable logic, circuitry, and interfaces that may be configured to verify an electronic document as a valid document, once the electronic document is generated and digitally signed by a hash. Examples of the authorizer device 106 may include, but are not limited to, a computing device, a mobile phone, a smart phone, a server, a remote server, a mainframe machine, a computer work-station, and/or a CE device. In at least one embodiment, the entire functionality of the authorizer device 106 may be incorporated in the user device 104, without a deviation from scope of the disclosure.

The client 108 may be a computer application, such as a web browser on the user device 104. The client 108 may correspond to a platform on the user device 104 to access the client-side interface of the decentralized application associated with the data management system 102.

The distributed ledger 110 may be a decentralized and distributed database system that may maintain an immutable record of data operations or transactions. A set of data operations may be grouped together as a block and may be further linked to a previous block of data operations to form a chain of the plurality of blocks 114. All blocks of data operations may be stored in a decentralized manner, whereby all participants or nodes store all the plurality of blocks 114. Further, the distributed ledger 110 may include an operating system which may allow for deployment of the group of smart contracts 116 between multiple parties, for example, the user 118 and the data management system 102.

The distributed ledger 110 may be a chain of blocks which uses accounts as state objects and a state of each account can be tracked by the chain. Herein, the accounts represent identities of users, mining nodes, or automated agents. All the blocks of data operations or the smart contract are associated with the accounts on the chain of blocks.

By way of example, and not limitation, the distributed ledger 110 may be an Ethereum blockchain which may use accounts as state objects and a state of each account can be tracked by the Ethereum blockchain. Herein, the accounts represent identities of users, mining nodes, or automated agents. All the blocks of data operations or the smart contract are associated with the accounts on the Ethereum Blockchain. The scope of the disclosure may not be limited to the implementation of the distributed ledger 110 as the Ethereum blockchain, a Hyperledger blockchain, or a Corda blockchain. Other implementations of the distributed ledger 110 may be possible in the present disclosure, without a deviation from the scope of the present disclosure.

The plurality of blocks 114 may store the document information for a plurality of users and may include a set of template-data blocks and a set of user-data blocks. The set of template-data blocks may correspond to a set of templates of the electronic document for one or more domains. Similarly, the set of user-data blocks may include personal data of the plurality of users for the set of templates of the electronic document.

The communication network 112 may include a communication medium through which the data management system 102, the user device 104, the authorizer device 106, and the distributed ledger 110 may communicate with each other. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the distributed ledger 110 may host the decentralized application (not shown in FIG. 1). On the user device 104, the client 108 may receive a first user input (e.g., a Uniform Resource Locator (URL)) to access the client-side interface of the decentralized application. Once the client-side interface is loaded and displayed on the user interface of the user device 104, the client 108 may receive a second user input as a user request to generate the electronic document for a particular domain, which is of interest to the user 118. The client 108 may transmit the user request to the data management system 102, via the client-side interface. Based on the second user input, the data management system 102 may initiate a process to generate the electronic document, as briefly described herein.

The data management system 102 may receive the user request from the client 108 for the generation of the electronic document associated with the user 118. The user request may include, for example, a user ID. The data management system 102 may identify a domain associated with the received user request. Examples of the domain may include, but are not limited to, an education domain, a medical domain, or a retail/e-commerce domain.

For example, in case of the education domain, the electronic document may correspond to, but may not be limited to, a high school document, a graduation document, a post-graduation document, or a mark-sheet document. Further, in case of the medical domain, the electronic document may correspond to, but may not be limited to, a medical prescription, a pathological test report, or a medical diagnostic report. In addition, in case of the retail/e-commerce domain, the electronic document may correspond to, but may not be limited to, a sale invoice, a purchase order, or an inventory/stock-taking sheet. Thereafter, the data management system 102 may select one or more smart contracts from the group of smart contracts 116 for the identified domain and then extract user-specific information for the electronic document from one of the plurality of blocks 114 of the document information stored on the distributed ledger 110. For example, the user-specific information may include private information (or personally identifiable information (PII)), such as, name, address, designation, employment details, financial information, and medical records. The data management system 102 may rely on the user ID and the selected one or more smart contracts to extract the user-specific information from the distributed ledger 110.

The data management system 102 may determine a content ID associated with template information for the electronic certification. In accordance with an embodiment, the content ID may correspond to a hash key based on which the template information may be hashed and stored in the plurality of blocks 114 on the distributed ledger 110. The template information may include information that may be common to electronic documents of a domain. For example, the template information of a high school document may include a name of the education institution, a name of the education board, a watermark of the education board/education institution, and authorized signatories of the education board/education institution.

In an embodiment, the data management system 102 may extract the template information from the plurality of blocks 114 of the document information stored on the distributed ledger 110. Such extraction of the template information may be based on the determined content ID and the selected one or more smart contracts. The data management system 102 may query the selected one or more smart contracts using the content ID to search for the template information from the plurality of blocks 114. For example, the content ID may be used as a hash key to search for the template information hashed and stored on the plurality of blocks 114 on the distributed ledger 110.

The data management system 102 may be configured to generate the electronic document based on the extracted user-specific information and the extracted template information. The electronic document may be generated based on a combination of the extracted user-specific information and the extracted template information. For example, in the case of the high school document of the education domain, the user-specific information may include a student's name, date of birth, and subjects chosen. The template information may include a name of the education institution, a name of the education board, watermark information, authorized signatories for the document, and placeholders for inclusion of the user-specific information. The data management system 102 may generate the electronic document by populating an empty file with the template information and the aforementioned user-specific information in the placeholders of the template information. Thereafter, the server-interface of the data management system 102 may transmit the generated electronic document to the client-interface loaded on the client 108. The generation of the electronic document based on the distributed ledger 110 is further explained, for example, in FIG. 4.

Figure 2:
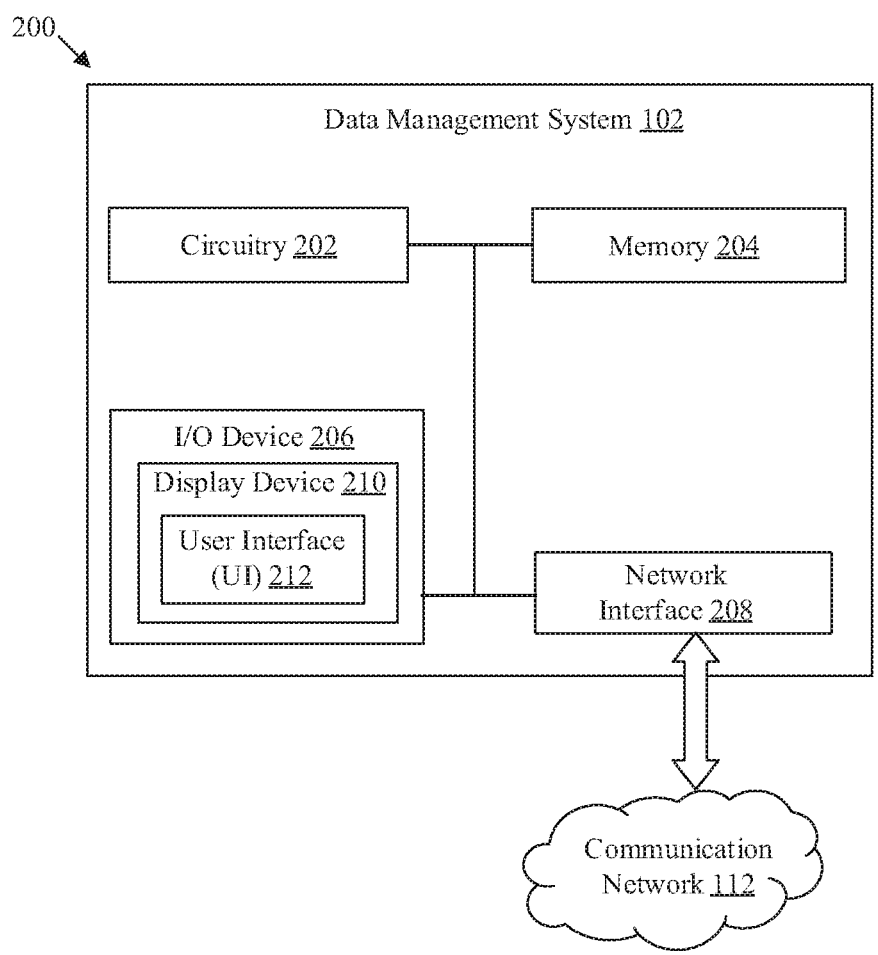
FIG. 2 is a block diagram that illustrates a data management system for generation of electronic documents, in accordance with an embodiment of the disclosure.

FIG. 2 is a block diagram that illustrates a data management system for generation of electronic documents, in accordance with an embodiment of the disclosure. FIG. 2 is explained in conjunction with elements from FIG. 1. With reference to FIG. 2, there is shown a block diagram 200 that depicts the data management system 102. The data management system 102 includes circuitry 202, a memory 204, an input/output (I/O) device 206, and a network interface 208. The I/O device 206 may include a display device 210 and a user interface (UI) 212. The circuitry 202 may be configured to communicate with the user device 104, the authorizer device 106, and the distributed ledger 110, via the communication network 112, by use of the network interface 208.

The circuitry 202 may include suitable logic, circuitry, interfaces, and/or code that may be configured to execute instructions stored in the memory 204. Some of the instructions may be associated with operations to handle user requests to generate electronic document(s) for one or more domains. Additionally, these instructions may be associated with user verification, file handling operations, smart contract management, and the like. Examples of implementation of the circuitry 202 may include a Central Processing Unit (CPU), x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), co-processors, other processors, and/or a combination thereof.

The memory 204 may include suitable logic, circuitry, and/or interfaces that may be configured to store the instructions executable by the circuitry 202. Examples of implementation of the memory 204 may include, but are not limited to, Random Access Memory (RAM), Read Only Memory (ROM), Hard Disk Drive (HDD), and/or a Secure Digital (SD) card.

The I/O device 206 may include suitable logic, circuitry, and interfaces that may be configured to receive an input and provide an output based on the received input. The I/O device 206 may include various input and output devices, which may be configured to communicate with the circuitry 202. Examples of the I/O device 206 may include, but are not limited to, a touch screen, a keyboard, a mouse, a joystick, a display device (for example, the display device 210), a microphone (not shown in FIG. 2), and a speaker (not shown in FIG. 2).

The network interface 208 may include suitable logic, circuitry, interfaces, and/or code that may be configured to enable communication between the data management system 102, the user device 104, the authorizer device 106, and the distributed ledger 110, via the communication network 112. The network interface 208 may implement known technologies to support wired or wireless communication with the communication network 112.

The network interface 208 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g, IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The display device 210 may include suitable logic, circuitry, and interfaces that may be configured to display an output of the data management system 102. The display device 210 may be utilized to render the UI 212. In some embodiments, the display device 210 may be an external display device associated with the data management system 102. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display.

Figure 3:
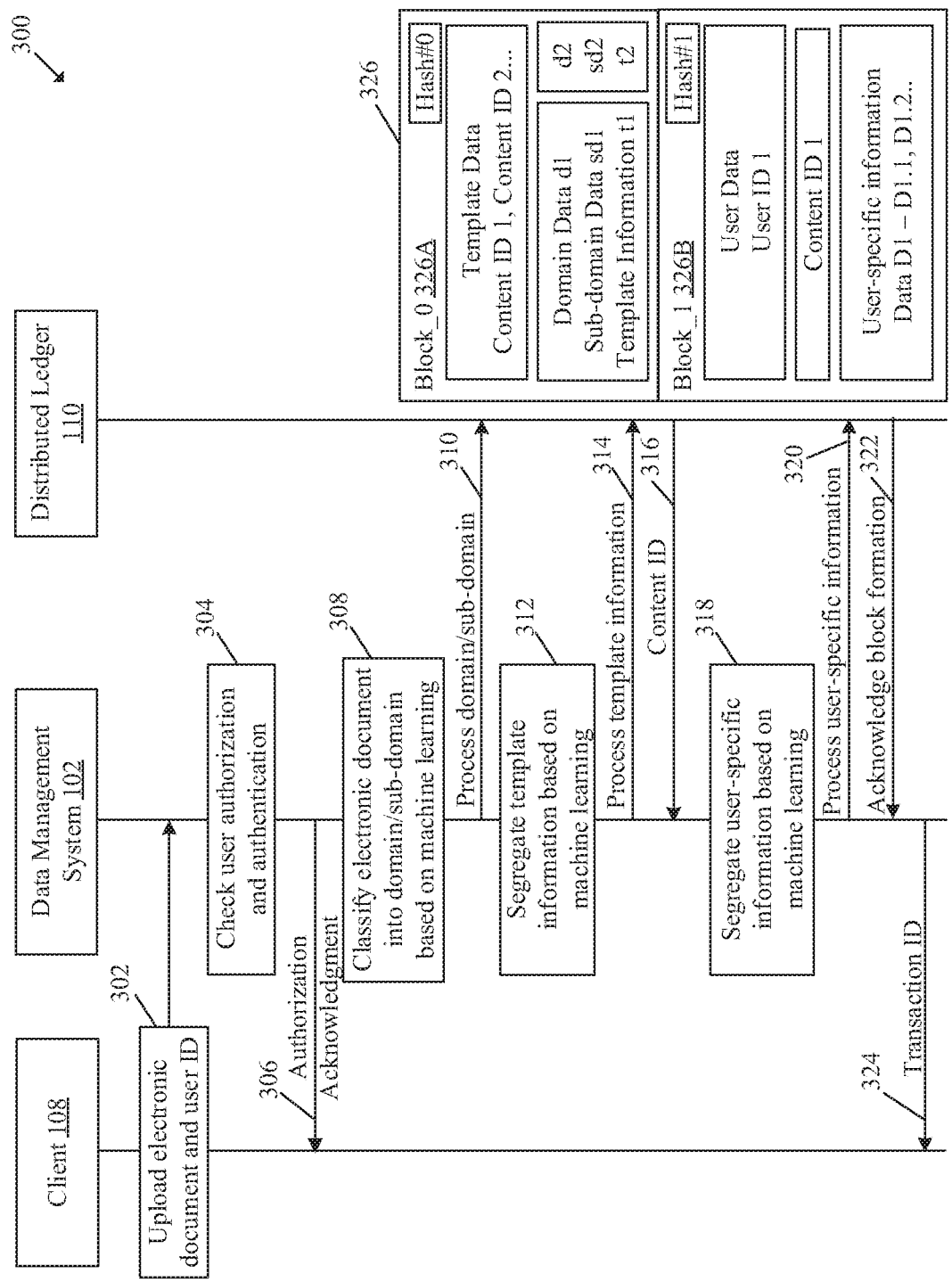
FIG. 3 is a sequence diagram that illustrates creation of blocks on a distributed ledger, in accordance with an embodiment of the disclosure.

The creation of the plurality of blocks 114 of the distributed ledger 110 is further explained, for example, in FIG. 3. The generation of the electronic document based on the distributed ledger 110 is further explained, for example, in FIG. 4. The configuration of the domain is further explained, for example, in FIG. 5.

FIG. 3 is a sequence diagram that illustrates creation of blocks on a distributed ledger, in accordance with an embodiment of the disclosure. FIG. 3 is explained in conjunction with elements from FIG. 1 and FIG. 2. With reference to FIG. 3, there is shown a sequence diagram 300 that illustrates a method for creation of the plurality of blocks 114 of the certification information on the distributed ledger 110. The sequence of operations may be from 302 to 324, which may be executed by various elements of the network environment 100, such as, but not limited to, the data management system 102, the client 108, and the distributed ledger 110. There is further shown an exemplary set of blocks 326, which may be a portion of the plurality of blocks 114 and may be created based on the method described herein.

At 302, an electronic document may be uploaded via the client 108 to the data management system 102. Additionally, along with the uploaded document, a user ID may be provided to the data management system 102. In certain embodiments, before the electronic document is uploaded, the client 108 may receive a user input to electronically scan a hard copy (i.e. a physical copy) of a document to generate the document of the user 118. Alternatively, the document may already be in an electronically scanned format.

For the user ID, the user 118 may provide his/her user credentials to access the data management system 102 through the client 108. The client 108 (or the data management system 102) may determine the user ID of the user 118 based on the user credentials. Once determined, the client 108 may upload the document (e.g., an electronically scanned version of the physical copy) and provide the user ID along with the uploaded document to the data management system 102. The data management system 102 receives the uploaded document.

At 304, the data management system 102 may check for authentication and authorization of the user 118 to upload the document. In other words, the data management system 102 may verify the user identity and check for specific permissions for the user 118 to upload the document. For example, the user 118 may only be allowed to upload documents for particular domains and some domains may be restricted for the user 118. Based on the user credentials (or the user ID), the data management system 102 may authenticate and authorize the user 118 to further provide the document so as to be processed and uploaded onto the distributed ledger 110 as document information of the user 118.

At 306, the data management system 102 may transmit an authorization acknowledgement to the client 108 based on a determination that the user 118 is authenticated and authorized to upload the document.

At 308, the data management system 102 may classify the uploaded document into a domain and/or a sub-domain by use of a first machine learning model. The first machine learning model may be trained on templates of documents from multiple domains/sub-domains, as part of a multi-class classification task to classify documents into particular domains and/or sub-domains. Examples of the first machine learning model may include, but are not limited to, a Linear Regression model, a Logistic Regression model, a Decision Tree model, a Support Vector Machine (SVM) model, Naive Bayes model, an Artificial Neural Network (ANN) model, a Deep Neural Network (DNN) model, a k-Nearest Neighbors (kNN) model, a k-Means model, or Random Forest model. For example, consider a scenario where the uploaded document is a graduation document for a particular discipline. Based on application of the first machine learning model-based classifier, the data management system 102 may classify the uploaded graduation document as belonging to the education domain and the graduation sub-domain.

At 310, the data management system 102 may process the classified domain and/or the sub-domain. As part of the process, the data management system 102 may extract information related to the classified domain and/or the sub-domain. Such extracted information may include an indication of the classified domain (e.g., a domain name) and an identifier associated with the classified domain (e.g., a domain ID). Similarly, the extracted information related to the classified sub-domain, if any, may include an indication of the classified sub-domain and an identifier associated with the classified sub-domain (e.g., a sub-domain ID). For example, the domain ID may correspond to a hash of the indication of the classified domain and similarly, the sub-domain ID may also correspond to a hash of the indication of the classified sub-domain.

At 312, the data management system 102 may segregate template information from the uploaded document based on a second machine learning model. The second machine learning model may be trained to identify template information from documents that are classified into particular domains or sub-domains. Examples of the second machine learning model may include, but are not limited to, a Linear Regression model, a Logistic Regression model, a Decision Tree model, an SVM model, Naive Bayes model, an ANN model, a DNN model, a k-NN model, a K-Means model, or a Random Forest model.

For example, the second machine learning model may be trained based on a set of templates extracted from documents that are previously used for classification into particular domains and/or sub-domains. For example, for the uploaded document to be a graduation document from the education domain and graduation sub-domain, the data management system 102 may apply the second machine learning model on the uploaded document to identify template information such as, watermark(s), a university name, a statement of appreciation, or signatures of authorized signatories. Such template information may be related to a domain/sub-domain of the uploaded document. In addition, the second machine learning model may also detect a presentation style, as part of the template information associated with the uploaded document. The presentation style may include, for example, a font size, text/image orientation, and text/image transparency associated with the uploaded document. The data management system 102 may create a particular data structure to store the identified template information, including the presentation style for the uploaded document.

In an embodiment, while attempting to segregate the template information from the uploaded document, the data management system 102 may be unable to match information in the uploaded document to at least one of the set of templates associated with the identified domain and/or the sub-domain of the uploaded document. In such an embodiment, the data management system 102 may create a new template for the uploaded document. Alternatively, the data management system 102 may transmit a document processing failure indication to the client 108 and request the user 118 to verify the uploaded document.

In an embodiment, the uploaded electronic document may belong to a certain domain and sub-domain. The uploaded electronic document may include a natural language text associated with the domain. The text may be arranged in the uploaded electronic document based on a certain document structure associated with the sub-domain of the uploaded electronic document. The data management system 102 may include a cognitive engine (a process, or server application) to perform data segregation for the uploaded electronic document to determine the domain and the sub-domain of the uploaded electronic document. Thus, based on the data segregation, the cognitive engine may identify the domain and sub-domain of the uploaded electronic document.

In certain embodiments, the data management system 102 may perform the data segregation for the uploaded document to automatically identify domain/sub-domain of the uploaded document, based on a natural language processing (NLP) technique. By way of example, using the NLP technique, the data management system 102 may perform a pattern analysis on a text within the uploaded document to categorize the uploaded document into a category. The data management system 102 may perform a semantic understanding of the structure of the uploaded document based on the category of the uploaded document. Thereafter, the uploaded document may be segregated into a certain domain/sub-domain based on the semantic understanding of the structure of the uploaded document.

For example, the data management system 102 may analyze the text in a document by use of the NLP technique to categorize the document into a medical category. As documents associated with the medical category may have a different structure/content as compared to documents from other domains, it may be needed to identify a domain/sub-domain of the document. On the basis of the semantic understanding of the structure of the document for the medical category, the data management system 102 may associate the document with a medical domain and a laboratory report sub-domain.

In another embodiment, the data management system 102 may be configured to check an authenticity of the uploaded document based on the identified domain or the sub-domain and the extracted template information. For example, the data management system 102 may check the authenticity of the uploaded document from the authorizer device 106 and/or a document verifier to detect whether the uploaded document is fraudulent or not. In an embodiment, the check for the authenticity of the uploaded document may be performed against a list of domains and sub-domains supported by the data management system 102. For example, the user may be allowed to upload documents related to an education domain, however, the user may upload a document related to a medical domain which may be unsupported by the data management system 102. In such a case, the uploaded document may be rejected by the data management system 102 as an unsupported document type.

At 314, the data management system 102 may process the segregated template information. As part of the process, the data management system 102 may create an initial data-block (e.g., a Block_0 326A) on the distributed ledger 110. The data management system 102 may transmit the segregated template information and the extracted information related to the classified domain and/or the sub-domain to the distributed ledger 110. The distributed ledger 110 may include the segregated template information and the extracted information in the initial data block.

Once created, the distributed ledger 110 may determine a content ID for the template information and insert the determined content ID in the initiate data block. For example, the content ID may be a hash of the template information in the initial data block. For example, the initial data block may include the content ID, the domain ID, the sub-domain ID (if any) and the template information. Thereafter, a hash value of content of the initial data-block (e.g., the Block_0 326A) may be determined and stored in the block itself (e.g., a "hash #0" hash value for the Block_0 326A). The initial data-block (e.g., the Block_0 326A) may correspond to a template-data block of the plurality of blocks 114.

An example of the initial data-block is illustrated as the Block_0 326A. It should be noted that the Block_0 326A shown in FIG. 3 is presented merely as an example and may not be construed as limiting for the disclosure. The present disclosure may be also applicable to an initial data-block for more than one document and/or for more than one domain/sub-domain.

At 316, the distributed ledger 110 may transmit the content ID associated with the template information to the data management system 102.

At 318, the distributed ledger 110 may segregate user-specific information based on a third machine learning model. The third machine learning model may be trained to detect user-specific information from documents classified into particular domains or sub-domains. Examples of the third machine learning model may include, but are not limited to, a Linear Regression model, a Logistic Regression model, a Decision Tree model, a SVM model, Naive Bayes model, an ANN model, a DNN model, a k-NN model, a k-Means model, or a Random Forest model.

For example, the third machine learning model may be trained based on a set of templates extracted from the electronic documents that are previously classified into particular domains or sub-domains. The set of templates may include information related to one or more users in a specific format. For example, in case the uploaded document is a graduation document (associated with the education domain and the graduation sub-domain), the data management system 102 may apply the third machine learning model on the graduation document to detect user-specific information in the graduation document. For example, the data management system 102 may detect a name of the user, a discipline, a college name, a subject, or a specialization, and optionally marks or grades obtained by the user in the graduation course as the user-specific information.

A person of ordinary skill in the art would understand that the entire functionality of the first machine learning model, the second machine learning model, and the third machine learning model may be incorporated in a single machine learning model to be used for domain or sub-domain identification, segregation of template information, and segregation of user-specific information from the uploaded document(s).

At 320, the data management system 102 may process the user-specific information. As part of the process, the data management system 102 may create a first user-data block (e.g., a Block_1 326B) on the distributed ledger 110. Thereafter, the data management system 102 may transmit the user-specific information (at 318) to the distributed ledger 110 along with the user ID, the content ID associated with the segregated template information. The distributed ledger 110 may include the user-specific information, the user ID, the content ID in the first user-data block. Thereafter, a hash value of the contents of the first user-data block (e.g., the Block_1 326B) may be determined and stored in the first user-data block (e.g., a "hash #1" hash value for the Block_1 326B).

An example of the first user-data block is illustrated as the Block_1 326B. It should be noted that the Block_1 326B shown in FIG. 3 is presented merely as an example and may not be construed as limiting for the disclosure. The present disclosure may be also applicable to a user data-block for more than one document and/or for more than one domain/sub-domain.

At 322, the distributed ledger 110 may transmit an acknowledgment of block formation to the data management system 102. For example, after the formation of the initial data-block, i.e., the template data-block (e.g., the Block_0 326A) and the first user-data block (e.g., the Block_1 326B), the distributed ledger 110 may transmit the acknowledgment indicative of the formation of the exemplary set of blocks 326 of the plurality of blocks 114, to the data management system 102.

At 324, the data management system 102 may transmit a transaction ID associated with the creation of the first user-data block (e.g., the Block_1 326B) to the client 108. The client 108 may display an indication to the user 118 that the document has been processed successfully and document information associated with the document has been uploaded on the distributed ledger 110.

Herein, a comparison between a traditional implementation and disclosed implementation of data storage in a blockchain is presented for performance evaluation, in Table 1, as follows:

TABLE 1

Exemplary data storage in block chain blocks of the traditional implementation and the disclosed implementation

| Block Chain Blocks | Size (Traditional implementation) | Size (Disclosed implementation) |
| --- | --- | --- |
| B1 | 0 KB (minimal size) | 0 KB (minimal size) |
| B2 | 100 KB | 100 KB |
| B3 | 100 KB | 10 KB |
| B4 | 100 KB | 10 KB |

As shown in the Table 1, Block B1 may correspond to a data block with zero bytes (no data, i.e., 0 KB size) in both the traditional and disclosed implementations. Block B2 may correspond to a provider block for both the implementations. For example, the Block B2 may be of 100 KB size in both the implementations. The Block B2 may include information related to a provider of the blockchain and a hash of the Block B2. Further, Blocks B3 and B4 may correspond to user data blocks of both the blockchain implementations. In case of the traditional implementation, each of the user data blocks (i.e., B3 and B4) may include data of complete document (including the template information and the user-specific information) and hash of the respective user data blocks. However, in case of the disclosed implementation, the user data blocks (i.e., B3 and B4) may only include the user-specific information associated with the document and hash of the respective user data blocks. Thus, the size of such user data blocks (i.e., B3 and B4) may be smaller in case of the disclosed implementation (e.g., 10 KB each), as compared to that of the traditional implementation (e.g., 100 KB each). Thus, the disclosed implementation of data storage in blockchain may have a lower memory footprint, which may lead to an increased efficiency for data retrieval.

Figure 4:
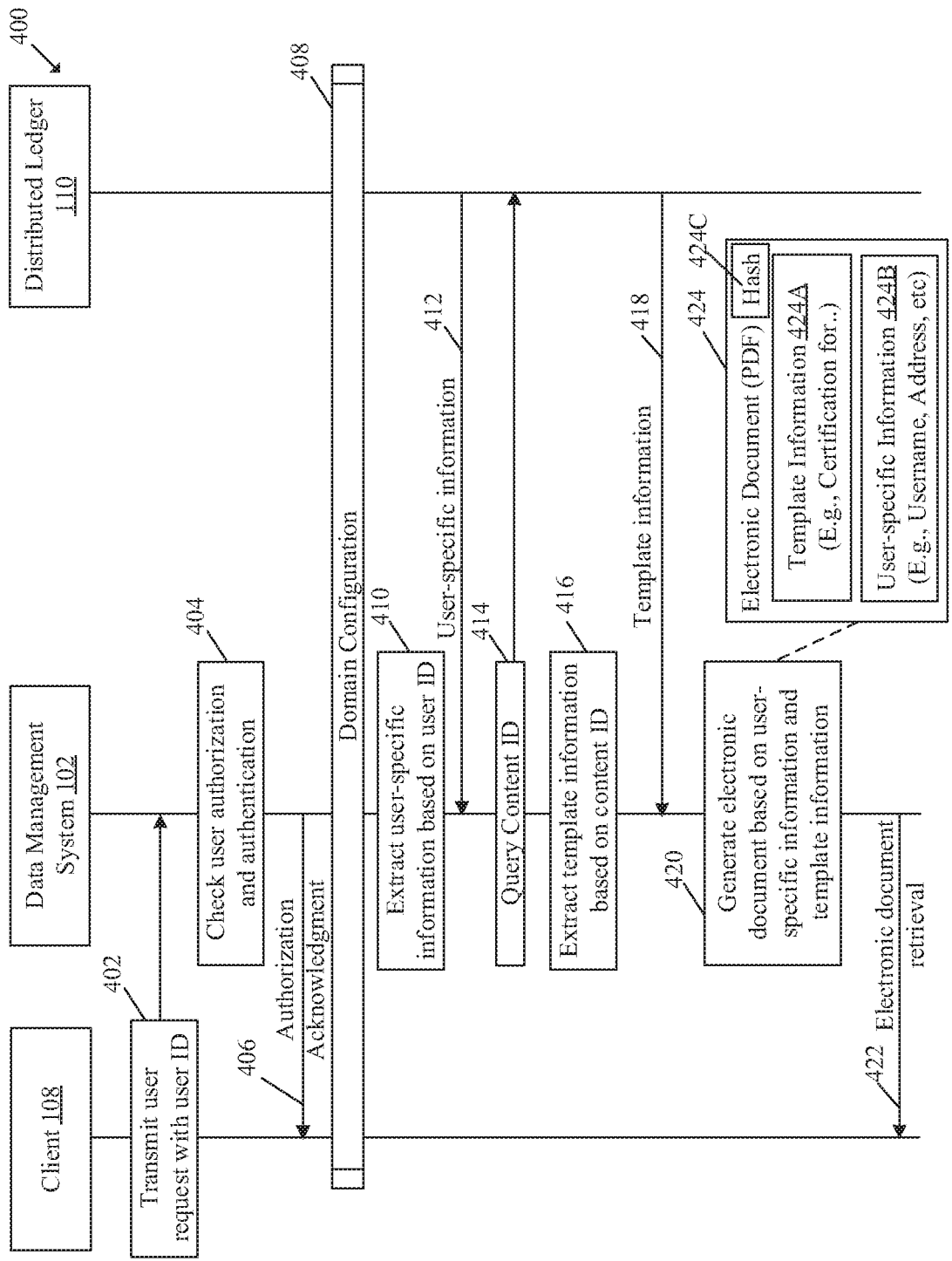
FIG. 4 is a sequence diagram that illustrates generation of an electronic document based on a distributed ledger, in accordance with an embodiment of the disclosure.

FIG. 4 is a sequence diagram that illustrates generation of an electronic document based on a distributed ledger, in accordance with an embodiment of the disclosure. FIG. 4 is explained in conjunction with elements from FIG. 1, FIG. 2, and FIG. 3. With reference to FIG. 4, there is shown a sequence diagram 400 that illustrates a method for generation of an electronic document. The sequence of operations may be from 402 to 422 and may be executed by various elements of the network environment 100, such as, the client 108, the data management system 102, and the distributed ledger 110. An exemplary electronic document 424 may be generated based on the method described herein.

At 402, the client 108 may transmit a user request with a user ID of the user 118 to the data management system 102. The user request may be generated based on a user input received from the user 118 through the client 108. The user input may be indicative of a request to generate and/or share an electronic document of the user 118 with a requesting entity. The user input may also include user credentials based on which the client 108 may extract the user ID.

At 404, the data management system 102 may authenticate the user 118 to be a valid user with a valid identity and authorize the user 118 to request the electronic document based on the user ID. In certain embodiments, the user request may also include an indication of a domain and/or a sub-domain associated with the user request. In such embodiments, the data management system 102 may further authorize the user 118 to request the electronic document based on the indication of the domain and/or the sub-domain associated with the user request.

In certain embodiments, based on the user ID, the data management system 102 may verify the identity of the user 118 associated with the received user request. Additionally, or alternatively, the data management system 102 may determine a set of user permissions associated with the received user request. For example, each user may have an associated set of permissions (e.g., permissions to request electronic documents for specific domains/sub-domains). For example, the data management system 102 may match the domain or sub-domain indicated in the user request with the set of user permissions associated with allowed domains/sub-domains for the user 118. Based on the verification of the identity and the determined set of user permissions, the data management system 102 may authenticate the received user request.

At 406, the data management system 102 may transmit an acknowledgement to the client 108 based on a determination that the user 118 is authenticated and authorized to request the electronic document.

At 408, domain configuration may be performed. As part of a process for the domain configuration, a domain and/or sub-domain associated with the received user request may be identified. Additionally, one or more smart contracts may be selected from the group of smart contracts 116 based on the identified domain and/or sub-domain. The sequence of operations related to the domain configuration have been explained further, for example, in FIG. 5.

At 410, the data management system 102 may extract user-specific information from the distributed ledger 110 based on the user ID received in the user request and the one or more smart contracts selected from the group of smart contracts 116. The user-specific information may be extracted from the document information on the distributed ledger 110. Herein, the document information may be referred to as a collection of user-specific and template information for multiple users and may be stored in the plurality of blocks 114 on the distributed ledger 110.

In an embodiment, to extract the user-specific information, the data management system 102 may input the user ID to the selected one or more smart contracts associated with the distributed ledger 110. For example, the user ID may be used by the selected one or more smart contracts to look up for a user-data block associated with the identified domain or the sub-domain of the user request. Based on a response of the one or more smart contracts, the data management system 102 may determine the user-data block associated with the identified domain (or the sub-domain) of the user request. Thereafter, the user-specific information may be extracted from the determined user-data block.

The user-data block may correspond to one of the plurality of blocks 114 of the document information and may store, for example, the user-specific information, the content ID, and a hash for the electronic document. For example, the user-data block may correspond to the first user-data block (e.g., Block_1 326B) illustrated in FIG. 3.

At 412, the distributed ledger 110 may transmit the extracted user-specific information to the data management system 102.

At 414, the data management system 102 may input a query for a content ID associated with the user request to the distributed ledger 110. Herein, the content ID may be associated with template information for the electronic document. The data management system 102 may receive a response for the query from the distributed ledger 110 and may determine the content ID based on the response received for the query. In certain embodiments, as the content ID may be stored in a user-data block, the distributed ledger 110 may retrieve the content ID from the user-data block (e.g., Block_1 326B illustrated in FIG. 3), while extracting the user-specific information from the same user-data block.

At 416, the data management system 102 may extract template information from the distributed ledger 110 based on the content ID and the one or more smart contracts selected from the group of smart contracts 116. The template information may be extracted from the document information stored on the distributed ledger 110. By way of example, to extract the template information, the data management system 102 may input the content ID to the selected one or more smart contracts. For example, the data management system 102 may execute the selected one or more smart contracts based on the content ID and determine a template-data block associated with the identified domain of the user request based on a response of the selected one or more smart contracts. Herein, the template-data block may correspond to one of the plurality of blocks 114 of the document information on the distributed ledger 110 and may store, for example, the template information, the content ID, domain information, sub-domain information, and a hash of the template-data block. For example, the template-data block may correspond to the initial data-block (e.g., Block_0 326A) illustrated in FIG. 3. The template information may be extracted from the determined template-data block.

In certain embodiments, the identified domain of the user request may include a set of sub-domains. Each sub-domain in the set of sub-domains may have a different template for the electronic document. For example, an education domain may have different sub-domains, such as high school certifications, diploma certifications, and graduation certifications. A template for a high school document may be different from a template for the graduation document. Thus, in such embodiments, the data management system 102 may determine a sub-domain from the set of domains based on the received user request and further determine a sub-domain ID associated with the template information for the electronic document based on the determined sub-domain. The data management system 102 may extract the template information from the distributed ledger 110 further based on the determined sub-domain ID. In this scenario, the template-data block may also include the sub-domain ID. For example, the sub-domain ID may be passed as an input to the selected one or more smart contracts. These smart contract(s) may use the sub-domain ID to look up for the template-data block on the distributed ledger 110. Thereafter, the template information may be extracted from the template-data block which may be storing the template information relevant for the identified sub-domain.

At 418, the distributed ledger 110 may transmit the template information extracted from the template-data block to the data management system 102.

At 420, the data management system 102 may generate the electronic document based on the extracted user-specific information and the extracted template information. By way of example, with the extracted user-specific information and the extracted template information belonging to one of the set of templates of the electronic document for the identified domain, the data management system 102 may create an electronic file (e.g., in a portable document format (pdf)) and populate the electronic file with the extracted user-specific information and the template information to generate the electronic document. While populating, the data management system 102 may follow a presentation style (e.g., font, color, margins, and placement) for the template of the electronic document.

In FIG. 4, there is shown the exemplary electronic document 424. For example, the exemplary electronic document 424 may be a graduation document and may include template information 424A, such as, a name of an institution/university, a statement of appreciation, a watermark, and signatures of authorized signatories. This template information 424A may also include presentation style information, which may govern how the template information 424A and user-specific information 424B may be incorporated in the exemplary electronic document 424. Examples of the presentation style information may include, but are not limited to, a font size, a text/image orientation, and a text/image transparency, a color, and a text/image position. The user-specific information 424B of the exemplary electronic document 424 may include, for example, a username, subjects or a specialization, a course discipline, grade(s) or mark(s) obtained by the user 118, and the like.

In an embodiment, the data management system 102 may be configured to digitally sign the generated electronic document with a hash stored in the user-data block. For example, the data management system 102 may digitally sign the electronic document 424 with a hash 424C that may correspond to the hash value stored in the user-data block (e.g., "hash #1" of the first user-data block, Block_1 326B, illustrated in FIG. 3).

At 422, the electronic document may be retrieved by the client 108. Alternatively, the data management system 102 may share the electronic document as a readable file in a particular file format with the client 108. Examples of the particular file format may include, but are not limited to, a pdf file, a postscript file, an image file, a web-page, or a text file.

The electronic document, shared with the client 108, may be digitally signed using the hash value associated with the user-data block. In an embodiment, the data management system 102 may display an option on the client 108 to the user 118 for verification of the electronic document based on the hash value. Thereafter, through the client 108, the data management system 102 may receive a user input for selection of the displayed option. Based on this received user input indicative of a selection of the displayed option, the data management system 102 may output the hash stored on the user-data block on the client 108. The user device 104 may validate the electronic document based on a comparison of the hash value output from the data management system 102 and the hash associated with the electronic document.

Figure 5:
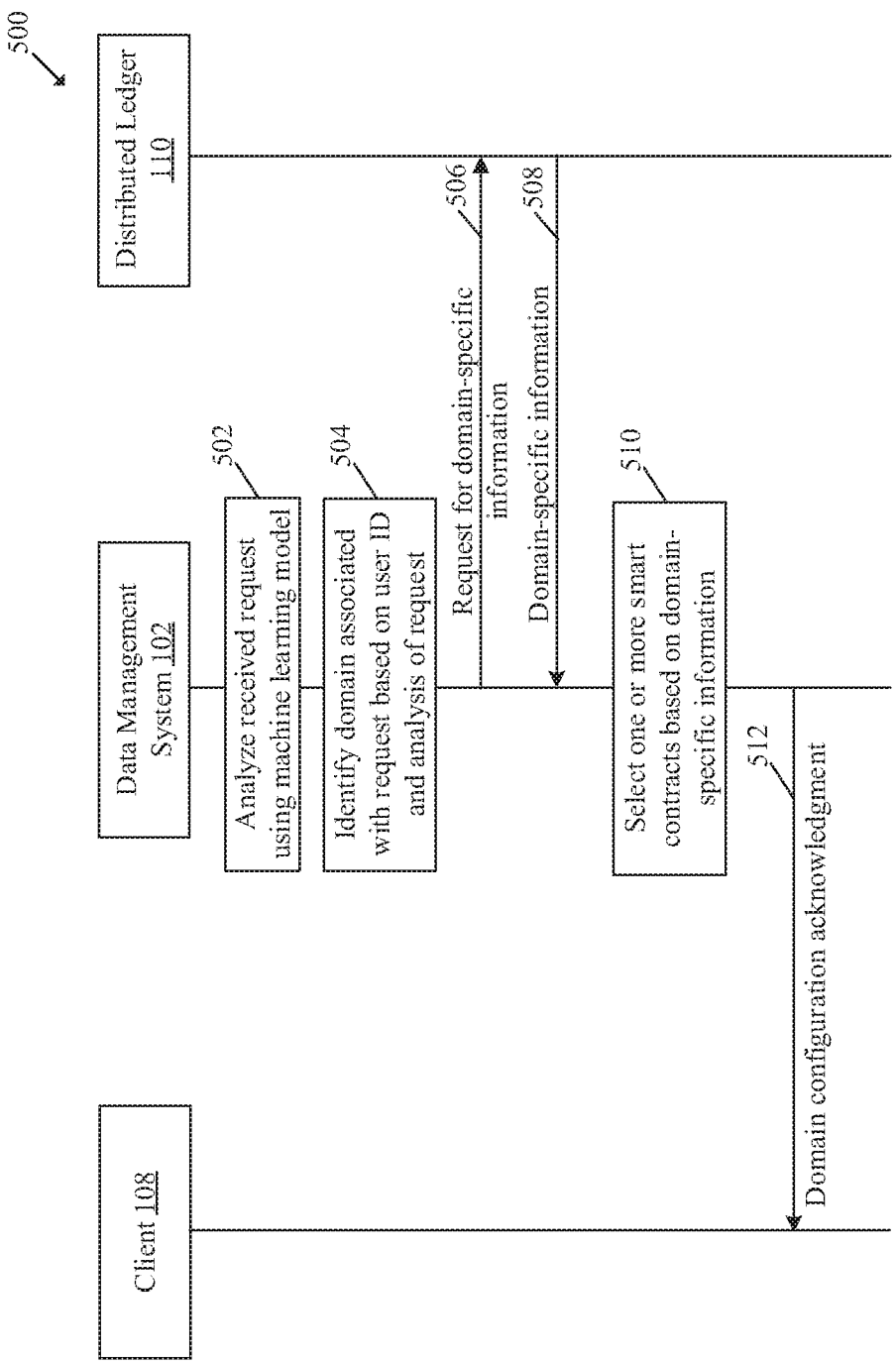
FIG. 5 is a sequence diagram that illustrates domain configuration based on a user request, in accordance with an embodiment of the disclosure.

FIG. 5 is a sequence diagram that illustrates domain configuration based on a user request, in accordance with an embodiment of the disclosure. FIG. 5 is explained in conjunction with elements from FIG. 1, FIG. 2, FIG. 3, and FIG. 4. With reference to FIG. 5, there is shown a sequence diagram 500 that illustrates a method (at 408 of FIG. 4) for domain configuration based on a user request to generate an electronic document. The sequence of operations may be from 502 to 512 and may be executed by various elements of the network environment 100, such as the client 108, the data management system 102, and the distributed ledger 110. Initially, through the client 108, the user 118 may provide a user input, which may be shared as the user request with the data management system 102. The user input may be provided over certain fields or options displayed on the client 108. For example, such fields may allow the user 118 to select a domain or a sub-domain before submitting the user request. The user request may include a user ID, indication of such fields and values input by the user 118 via such fields. For example, the user request may be for an electronic document associated with a particular domain and/or a sub-domain. The user 118 may enter values indicative of the domain and/or sub-domain in the one or more fields.

At 502, the data management system 102 may analyze the received user request using a machine learning model. For example, the user request may be analyzed by a cognitive engine of the data management system 102 based on the machine learning model and/or a natural language processing (NLP) model. In an embodiment, the machine learning model may be applied on information, such as the user ID, the indication of the fields, and the values input by the user 118 via the fields, to analyze the received user request. Examples of the machine learning model may include, but are not limited to, a Linear Regression model, a Logistic Regression model, a Decision Tree model, an SVM model, Naive Bayes model, an ANN model, a DNN model, a k-NN model, a K-Means model, or a Random Forest model.

At 504, the data management system 102 may identify a domain and/or a sub-domain associated with the user request based on the user ID and the analysis of the user request (as described at 502). Examples of the domain may include, but are not limited to, an education domain, a medical/health care domain, or a retail domain. Examples of the sub-domain may include, but are not limited to, a high school certification or graduation for the education domain; a medical prescription or a laboratory report for the medical/health care domain; and an invoice or a purchase order for the retail domain.

For example, in case the user request is for a graduation document, the user 118 may provide details, such as username, a type of document (e.g., mark sheet), a university name, and course name(s)/discipline. These user provided details may be included in the user request. Based on the analysis of these details within the user request, the data management system 102 may identify the domain of the user request as education and the sub-domain as graduation.

At 506, the data management system 102 may transmit a request to the distributed ledger 110 for retrieval of domain-specific information. The request for the domain-specific information may be transmitted based on the identification of the domain and/or the sub-domain at 504.

At 508, the distributed ledger 110 may transmit the domain-specific information associated with the identified domain and/or the sub-domain to the data management system 102. The domain-specific information may include an indication of the domain and/or sub-domain and an identifier of the domain and/or sub-domain (e.g., a domain ID of the identified domain and/or a sub-domain ID of the identified sub-domain). The identifier of the domain and/or sub-domain may correspond to a hash of the indication of the domain and/or sub-domain, respectively. Additionally, or alternatively, the domain-specific information may include an authorized configuration list associated with the user 118. The authorized configuration list may correspond to an authorized list of smart contracts for the domain and/or the sub-domain associated with the user request.

At 510, the data management system 102 may select one or more smart contracts from the authorized list of smart contracts (also referred to as the group of smart contracts 116) specified in the domain-specific information. Such a selection may be further based on a determination that the received user request is authenticated. For example, the data management system 102 may use the domain ID and/or sub-domain ID (determined at 508) to look up one or more smart contracts in authorized list.

At 512, the data management system 102 may share a domain configuration acknowledgment with the client 108. Once the domain configuration acknowledgment is shared, the identified domain and/or sub-domain may be determined as configured for the user request. Thereafter, the electronic document requested by the user 118 through the user request may be provided to the user 118 based on operations from 410 to 422 of FIG. 4.

Figure 6:
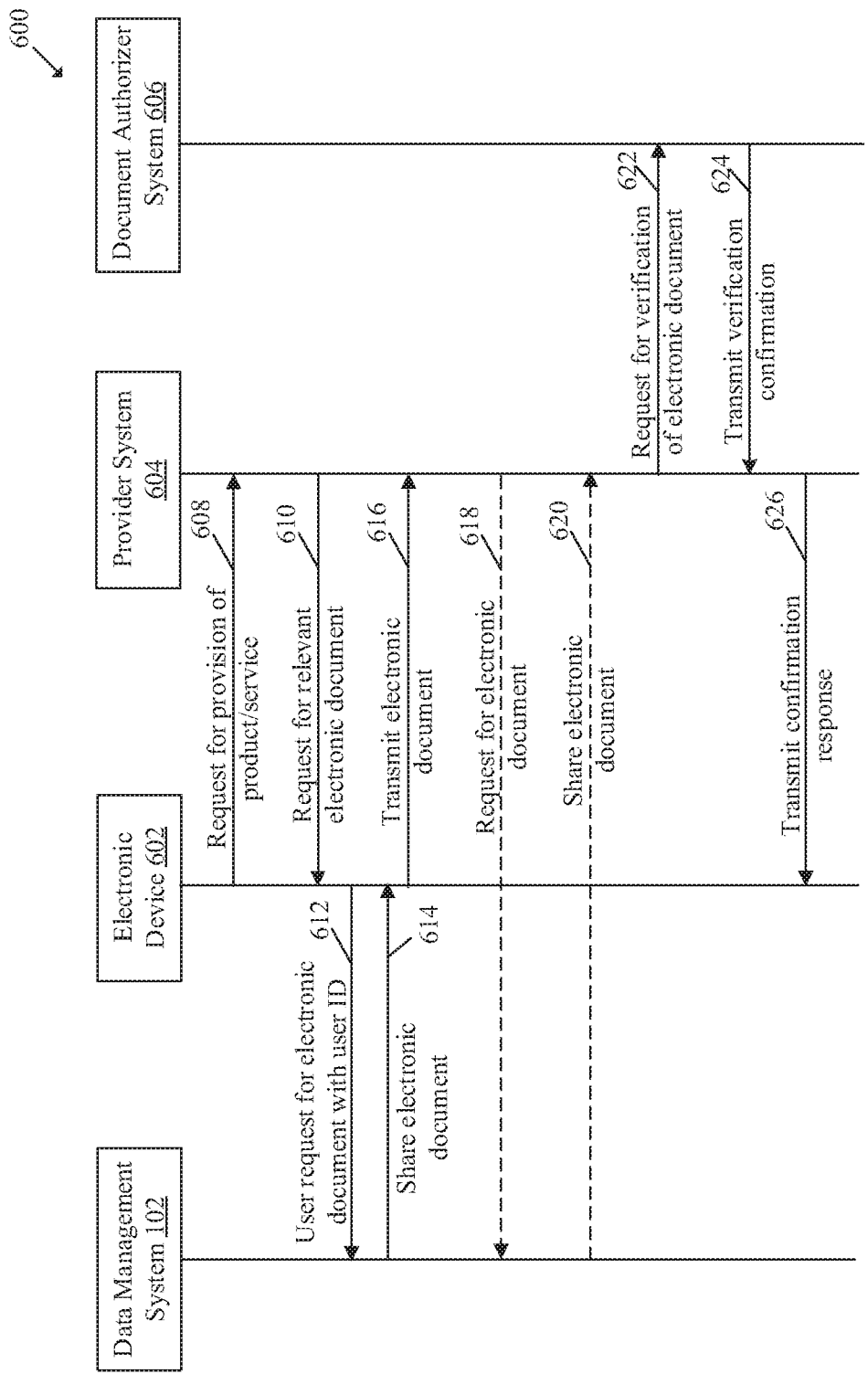
FIG. 6 is a sequence diagram that illustrates an exemplary implementation of the data management system of FIG. 2, in accordance with an embodiment of the disclosure.

FIG. 6 is a sequence diagram that illustrates an exemplary implementation of the data management system of FIG. 2, in accordance with an embodiment of the disclosure. FIG. 6 is explained in conjunction with elements from FIG. 1, FIG. 2, FIG. 3, FIG. 4, and FIG. 5. With reference to FIG. 6, there is shown a sequence diagram 600 that illustrates an exemplary implementation of the data management system 102 of FIG. 2. The sequence of operations may be from 608 to 626 and may be executed by various elements such as, the data management system 102, an electronic device 602, a provider system 604, and a document authorizer system 606.

The electronic device 602 may correspond to the user device 104 and may include a client (not shown in FIG. 6) associated with the electronic device 602. Similarly, the provider system 604 may correspond to an application server of a provider that may host at least one web application to allow a user to request for a product or service offered by the provider (e.g., a university) based on an electronic document (e.g., an education certificate) of the user. The document authorizer system 606 may correspond to the authorizer device 106, which may be configured to verify the electronic document of the user.

At 608, the electronic device 602 may transmit, to the provider system 604, via the client, a request for provision of a product or service offered by the provider system 604. The client may access the web application which may allow the user to request for the product or the service. For example, the product or service may correspond to a health insurance product offered by an insurance or a banking company.

At 610, the provider system 604 may transmit a request for a relevant electronic document of the user to the electronic device 602. For example, in case the product or service is a health insurance product, the provider system 604 may request for an electronic document associated with a medical report of the user.

At 612, the electronic device 602 may transmit a user request with a user ID for retrieval of the electronic document to the data management system 102 (in a manner similar to that explained in FIG. 4). Operations from 402 to 422 may be performed as explained in FIG. 4 based on the transmitted user request.

At 614, the data management system 102 may share the electronic document with the electronic device 602, in a manner similar to that explained in FIG. 4.

At 616, the electronic device 602 may transmit the electronic document of the user to the provider system 604. Optionally, instead of operations at 610, 612, 614, and 616, following operations from 618 to 620 may be performed to obtain the electronic document.

At 618, the provider system 604 may directly transmit a request for the electronic document to the data management system 102. In this scenario, the provider system 604 may receive the user ID of the user with the request for the product or service from the electronic device 602. The request for the electronic document may include the user ID.

At 620, the data management system 102 may share the electronic document of the user with the provider system 604.

At 622, the provider system 604 may transmit a request for verification of the electronic document to the document authorizer system 606. Such a request for verification may include the electronic document, which may be digitally signed with a hash value.

The document authorizer system 606 may extract the hash value from the electronic document and request the data management system 102 to share a hash associated with a user-data block of the user on the distributed ledger 110. Based on the request, the document authorizer system 606 may receive the requested hash associated with the user-data block and may compare the hash value from the electronic document with the requested hash to validate the electronic document.

At 624, the document authorizer system 606 may transmit a verification confirmation to the provider system 604 based on the validation of the electronic document. Thus, the verification confirmation may be transmitted when the hash value from the electronic document matches with the output hash value stored on the user-data block associated with the user.

At 626, the provider system 604 may transmit a confirmation response to the electronic device 602 based on the verification confirmation. In case the verification confirmation indicates that the electronic document is valid, the confirmation response may correspond to a confirmation of acceptance of the user's request for provision of the product/service of the provider for the user.

Figure 7:
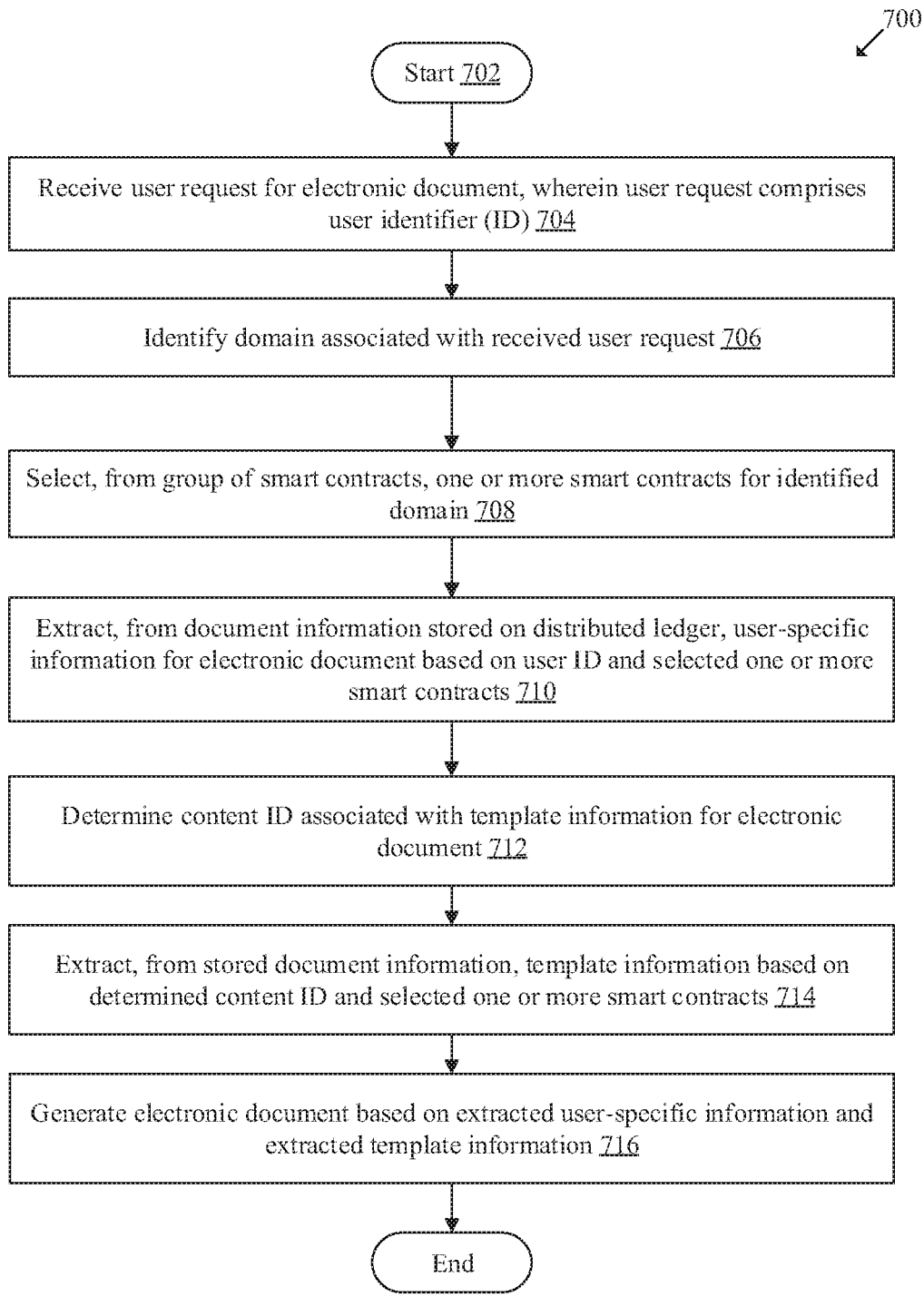
FIG. 7 is a flowchart that illustrates an exemplary method for generation of electronic documents based on a distributed ledger, in accordance with an embodiment of the disclosure.

FIG. 7 is a flowchart that illustrates an exemplary method for generation of electronic documents based on a distributed ledger, in accordance with an embodiment of the disclosure. FIG. 7 is described in conjunction with elements from FIGS. 1, 2, 3, 4, 5, and 6. With reference to FIG. 7, there is shown a flowchart 700. The exemplary method of the flowchart 700 may be executed by any computing system, for example, by the data management system 102 of FIG. 2. The exemplary method of the flowchart 700 may start at 702 and proceed to 704.

At 704, a user request for an electronic document may be received. In one or more embodiments, the data management system 102 may be configured to receive the user request for the electronic document from the client 108 of the user device 104. The user request may include a user ID of the user 118.

At 706, a domain associated with the received user request may be identified. In one or more embodiments, the data management system 102 may be configured to identify the domain associated with the received user request based on the user ID. The identification of the domain associated with the received user request has been explained further, for e.g., in FIG. 5.

At 708, one or more smart contracts may be selected for the identified domain, from the group of smart contracts 116. In one or more embodiments, the data management system 102 may be configured to select the one or more smart contracts from the group of smart contracts 116. The selection of the one or more smart contracts has been explained further for e.g., in FIG. 5.

At 710, user-specific information for the electronic document may be extracted from document information stored on the distributed ledger 110. In one or more embodiments, the data management system 102 may be configured to extract the user-specific information for the electronic document from the document information stored on the distributed ledger 110 based on the user ID and the selected one or more smart contracts. In an embodiment, the data management system 102 may execute the one or more smart contracts using the user ID as an input to determine a user-data block associated with the identified domain, from the distributed ledger 110. Thereafter, the data management system 102 may extract the user-specific information from the determined user-data block on the distributed ledger 110. The extraction of the user-specific information has been explained further, for e.g., in FIG. 4.

At 712, a content ID associated with template information for the electronic document may be determined. In one or more embodiments, the data management system 102 may be configured to determine the content ID associated with the template information for the electronic document. In an embodiment, the data management system 102 may input a query for the content ID to the distributed ledger 110 and determine the content ID based on a response received to the query. The determination of the content ID has been explained further, for e.g., in FIG. 4.

At 714, the template information for the stored document information may be determined. In one or more embodiments, the data management system 102 may be configured to determine the template information from the distributed ledger 110 based on the determined content ID and selected one or more smart contracts. In an embodiment, the data management system 102 may input the content ID to the selected one or more smart contracts and determine a template-data block associated with the identified domain from the distributed ledger 110 based on a response of the selected one or more smart contracts. Thereafter, the circuitry 202 may extract the template information from the determined template-data block. The determination of the template information has been explained further, for e.g., in FIG. 4.

At 716, the electronic document may be generated. In one or more embodiments, the data management system 102 may be configured to generate the electronic document based on the extracted user-specific information and the extracted template information. In an embodiment, the generated electronic document may be digitally signed with a hash value corresponding to a hash of the user-data block. The data management system 102 may then share the digitally signed electronic document with the client 108 of the user device 104. The generation of the electronic document and an example of the electronic document have been further explained, for e.g., in FIG. 4. The control may pass to end.

Various embodiments of the disclosure may provide a non-transitory, computer-readable medium and/or storage medium, and/or a non-transitory machine readable medium and/or storage medium stored thereon, instructions executable by a machine and/or a computer, such as a data management system, for generation of an electronic document based on a distributed ledger. The at least one code section may cause the machine and/or computer to perform operations that include reception of a user request for an electronic document. The user request may include a user ID. The data management system may be communicatively coupled to a distributed ledger that stores document information for a plurality of users and a group of smart contracts that controls access to the stored document information. The operations further include identification of a domain associated with the received user request. The operations further include selection of at least one smart contract from the group of smart contracts, for the identified domain. Further, the operations may include extraction, from the stored document information, user-specific information for the electronic document based on the user ID and the selected at least one smart contract. In addition, the operations include determination of a content ID associated with template information for the electronic document and extraction of the template information from the stored document information, based on the determined content ID and the selected at least one smart contract. The operations may further include generation of the electronic document based on the extracted user-specific information and the extracted template information.

Exemplary aspects of the disclosure may include the data management system 102 that includes the circuitry 202 communicatively coupled to the distributed ledger 110 that stores document information for a plurality of users and the group of smart contracts 116 that controls access to the stored document information. The circuitry 202 may be configured to receive a user request for an electronic document. The user request may include a user ID. The circuitry 202 may be further configured to identify a domain associated with the received user request. Further, the circuitry 202 may be configured to select at least one smart contract from the group of smart contracts 116, for the identified domain. The circuitry 202 may be further configured to extract, from the stored document information, user-specific information for the electronic document based on the user ID and the selected at least one smart contract. In addition, the circuitry 202 may be further configured to determine a content ID associated with template information for the electronic document and extract, from the stored document information, the template information based on the determined content ID and the selected at least one smart contract. The circuitry 202 may be further configured to generate the electronic document based on the extracted user-specific information and the extracted template information.

In accordance with an embodiment, the circuitry 202 may be configured to authenticate the received user request based on the user ID and the identified domain associated with the received user request. The circuitry 202 may be further configured to verify an identity of a user of the plurality of users associated with the received user request. Thereafter, the circuitry 202 may determine a set of user permissions associated with the received user request. Further, the circuitry 202 may authenticate the received user request based on the verification of the identity and the determined set of user permissions.

In accordance with an embodiment, the circuitry 202 may be configured to perform domain configuration for a domain and/or a sub-domain associated with the received user request. To perform the domain configuration, the circuitry 202 may be configured to analyze, using a machine learning model, the received user request. Thereafter, the circuitry 202 may identify the domain associated with the received user request based on the analysis of the received user request and the user ID. Further, the circuitry 202 may retrieve domain-specific information for the identified domain from the distributed ledger 110. The circuitry 202 may be further configured to select the at least one smart contract based on the retrieved domain-specific information of the identified domain and a determination that the received user request is authenticated.

In accordance with an embodiment, the distributed ledger 110 stores the plurality of blocks 114 that may include a set of template-data blocks and a set of user-data blocks. The set of template-data blocks may correspond to a set of templates of the electronic document for one or more domains. The set of user-data blocks may include personal data of the plurality of users for the one or more domains. In an embodiment, the extracted user-specific information and the extracted template information may belong to one of the set of templates of the electronic document for the identified domain of the one or more domains.

In accordance with an embodiment, the circuitry 202 may be configured to input a query for the content ID to the distributed ledger 110. The circuitry 202 may receive a response to the input query from the distributed ledger 110 and determine the content ID for the template information further based on the received response to the input query.

In accordance with an embodiment, the circuitry 202 may be configured to input the user ID to the at least one smart contract. Then, the circuitry 202 may determine, from the distributed ledger 110, a user-data block associated with the identified domain based on a response of the at least one smart contract. The user-data block may be one of the plurality of blocks 114 of the stored document information on the distributed ledger 110. Further, the circuitry 202 may extract the user-specific information from the determined user-data block on the distributed ledger 110. In an embodiment, the user-data block may store the user-specific information, the content ID, and a hash for the electronic document.

In accordance with an embodiment, the circuitry 202 may be configured to input the content ID to the at least one smart contract. Thereafter, the circuitry 202 may determine, from the distributed ledger 110, a template-data block associated with the identified domain based on a response of the at least one smart contract. The template-data block may be one of the plurality of blocks 114 of the stored document information on the distributed ledger 110. Further, the circuitry 202 may extract the template information from the determined template-data block. In an embodiment, the template-data block may store the template information, the content ID, domain information, sub-domain information, and a hash of the template-data block.

In accordance with an embodiment, the identified domain may include a set of sub-domains, each sub-domain having a different template for the electronic document. The circuitry 202 may be further configured to determine a sub-domain from the set of sub-domains associated with the identified domain based on the received user request. Thereafter, the circuitry 202 may determine a sub-domain ID associated with the template information for the electronic document based on the determined sub-domain. The circuitry 202 may be configured to extract the template information further based on the determined sub-domain ID.

In accordance with an embodiment, the circuitry 202 may be configured to transmit the generated electronic document as a readable file to the client 108 of the user device 104. In accordance with an embodiment, the circuitry 202 may be further configured to sign the generated electronic document digitally with the hash stored in the user-data block. Thereafter, the circuitry 202 may display an option on the client 108 of the user device 104 to verify the electronic document signed with the hash stored in the user-data block. The circuitry 202 may receive a user input for the selection of the displayed option. Thereafter, the circuitry 202 may output the hash stored in the user-data block on the client 108. In accordance with an embodiment, the electronic document may be validated on the user device 104 based on a comparison of the output hash with the hash associated with the electronic document.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims

What is claimed is:

1. A data management system, comprising:
   circuitry communicatively coupled to a distributed ledger that stores document information for a plurality of users and a group of smart contracts that controls access to the stored document information, wherein the circuitry is configured to:
      receive a user request for an electronic document wherein the user request comprises a user identifier (ID);
      analyze, by a machine learning model, the received user request;
      identify a domain associated with the received user request based on the user ID and the analysis of the received user request;
      retrieve domain-specific information for the identified domain from the distributed ledger;

determine the domain-specific information includes an authorized list of smart contracts for the identified domain;
determine the received user request is authenticated based on the determination that the domain-specific information includes the authorized list of smart contracts for the identified domain, wherein
the group of smart contracts corresponds to the authorized list of smart contracts;
select, from the authorized list of smart contracts, at least one smart contract for the identified domain based on the domain-specific information and the determination that the user request is authenticated;
extract, from the stored document information, user-specific information for the electronic document based on the user ID and the selected at least one smart contract;
determine a content ID associated with template information for the electronic document;
extract, from the stored document information, the template information based on the determined content ID and the selected at least one smart contract; and
generate the electronic document based on the extracted user-specific information and the extracted template information.

2. The data management system according to claim 1, wherein the circuitry is further configured to authenticate the received user request based on the user ID and the identified domain associated with the received user request.

3. The data management system according to claim 1, wherein the circuitry is further configured to:
verify an identity of a user of the plurality of users associated with the received user request;
determine a set of user permissions associated with the received user request; and
authenticate the received user request based on the verification of the identity and the determined set of user permissions.

4. The data management system according to claim 1, wherein the circuitry is further configured to:
input a query for the content ID to the distributed ledger;
receive a response to the input query from the distributed ledger; and
determine the content ID for the template information based on the received response to the input query.

5. The data management system according to claim 1, wherein the circuitry is further configured to:
input the user ID to the at least one smart contract;
determine, from the distributed ledger, a user-data block associated with the identified domain based on a response of the at least one smart contract,
wherein the user-data block is one of a plurality of blocks of the stored document information on the distributed ledger; and
extract the user-specific information from the determined user-data block on the distributed ledger.

6. The data management system according to claim 5, wherein the user-data block stores the user-specific information, the content ID, and a hash for the electronic document.

7. The data management system according to claim 6, wherein the circuitry is further configured to sign the generated electronic document digitally with the hash stored in the user-data block.

8. The data management system according to claim 7, wherein the circuitry is further configured to:
display an option on a client of a user device to verify the electronic document signed with the hash stored in the user-data block;
receive a user input for a selection of the displayed option; and
output the hash stored in the user-data block on the client, wherein the electronic document is validated on the user device based on a comparison of the output hash with the hash associated with the electronic document.

9. The data management system according to claim 5, wherein the circuitry is further configured to extract the user-specific information from the same user-data block from which the distributed ledger retrieves the content ID.

10. The data management system according to claim 1, wherein the circuitry is further configured to:
input the content ID to the at least one smart contract;
determine, from the distributed ledger, a template-data block associated with the identified domain based on a response of the at least one smart contract,
wherein the template-data block is one of a plurality of blocks of the stored document information on the distributed ledger; and
extract the template information from the determined template-data block.

11. The data management system according to claim 10, wherein the template-data block stores the template information, the content ID, domain information, sub-domain information, and a hash of the template-data block.

12. The data management system according to claim 1, wherein the distributed ledger stores a plurality of blocks that comprises a set of template-data blocks and a set of user-data blocks, wherein
the set of template-data blocks corresponds to a set of templates of the electronic document for one or more domains,
the set of user-data blocks comprises personal data of the plurality of users for the one or more domains, and
the extracted user-specific information and the extracted template information belongs to one of the set of templates of the electronic document for the identified domain of the one or more domains.

13. The data management system according to claim 1, wherein
the identified domain comprises a set of sub-domains, and
each sub-domain of the set of sub-domains has a different template for the electronic document.

14. The data management system according to claim 13, wherein the circuitry is further configured to:
determine a sub-domain from the set of sub-domains associated with the identified domain based on the received user request;
determine a sub-domain ID associated with the template information for the electronic document based on the determined sub-domain; and
extract the template information further based on the determined sub-domain ID.

15. The data management system according to claim 1, wherein the circuitry is further configured to transmit the generated electronic document as a readable file to a client of a user device.

16. A method, comprising:
in a data management system communicatively coupled to a distributed ledger that stores document information for a plurality of users and a group of smart contracts that controls access to the stored document information:

receiving a user request for an electronic document, wherein the user request comprises a user identifier (ID);

analyzing, by a machine learning model, the received user request;

identifying a domain associated with the received user request based on the user ID and the analysis of the received user request;

retrieving, from the distributed ledger, domain-specific information for the identified domain;

determining the domain-specific information includes an authorized list of smart contracts for the identified domain;

determining the received user request is authenticated based on the determination that the domain-specific information includes the authorized list of smart contracts for the identified domain, wherein
the group of smart contracts corresponds to the authorized list of smart contracts;

selecting, from the authorized list of smart contracts, at least one smart contract for the identified domain based on the domain-specific information and the determination that the user request is authenticated;

extracting, from the stored document information, user-specific information for the electronic document based on the user ID and the selected at least one smart contract;

determining a content ID associated with template information for the electronic document;

extracting, from the stored document information, the template information based on the determined content ID and the selected at least one smart contract; and generating the electronic document based on the extracted user-specific information and the extracted template information.

17. The method according to claim 16, further comprising:
inputting the user ID to the at least one smart contract;
determining, from the distributed ledger, a user-data block associated with the identified domain based on a response of the at least one smart contract,
wherein the user-data block is one of a plurality of blocks of the stored document information on the distributed ledger; and
extracting the user-specific information from the determined user-data block on the distributed ledger.

18. The method according to claim 17, wherein the user-data block stores the user-specific information, the content ID, and a hash for the electronic document.

19. The method according to claim 18, further comprising signing the generated electronic document digitally with the hash stored in the user-data block.

20. The method according to claim 16, further comprising:
inputting the content ID to the at least one smart contract;
determining, from the distributed ledger, a template-data block associated with the identified domain based on a response of the at least one smart contract,
wherein the template-data block is one of a plurality of blocks of the stored document information on the distributed ledger; and
extracting the template information from the determined template-data block.

* * * * *